US005486893A

United States Patent [19]

Takagi

[11] Patent Number: 5,486,893
[45] Date of Patent: Jan. 23, 1996

[54] CAMERA HAVING A DISPLAY FOR PREDICTED IMAGES

[75] Inventor: Tadao Takagi, Yokohama, Japan

[73] Assignee: Nikon Corporation, Tokyo, Japan

[21] Appl. No.: 456,371

[22] Filed: Jun. 1, 1995

Related U.S. Application Data

[63] Continuation of Ser. No. 312,985, Oct. 3, 1994, abandoned, which is a continuation of Ser. No. 133,798, Oct. 8, 1993, abandoned, which is a continuation of Ser. No. 822,954, Jan. 21, 1992, abandoned.

[30] Foreign Application Priority Data

Feb. 4, 1991 [JP] Japan .................................... 3-035725

[51] Int. Cl.$^6$ .............................. G03B 7/00; G03B 13/02
[52] U.S. Cl. ........................... 354/410; 354/412; 354/219
[58] Field of Search ..................................... 354/410, 412, 354/474, 400, 75, 76, 219; 345/115, 117, 119, 120; 358/909.1, 527; 348/64, 576, 588

[56] References Cited

U.S. PATENT DOCUMENTS

| | | | |
|---|---|---|---|
| 4,698,664 | 10/1987 | Nichols et al. | 358/10 |
| 4,742,369 | 5/1988 | Ishii et al. | 354/76 X |
| 4,827,347 | 5/1989 | Bell | 358/224 |
| 4,829,333 | 5/1989 | Inoue et al. | 354/412 |
| 4,857,994 | 8/1989 | Belmares-Sarabia et al. | 358/22 |
| 4,884,089 | 11/1989 | Taniguchi | 354/222 |
| 4,949,117 | 8/1990 | Van Heyningen et al. | 354/75 X |
| 4,963,907 | 10/1990 | Inoue et al. | 354/222 |
| 4,974,012 | 11/1990 | Ohsawa | 354/474 |
| 5,014,078 | 5/1991 | Kudo et al. | 354/222 X |
| 5,043,816 | 8/1991 | Nakano et al. | 358/909 X |
| 5,050,003 | 9/1991 | Horii et al. | 358/342 |
| 5,159,377 | 10/1992 | Suzuki et al. | 354/400 |

FOREIGN PATENT DOCUMENTS 62-50743 3/1987 Japan .

Primary Examiner—Russell E. Adams
Attorney, Agent, or Firm—Shapiro and Shapiro

[57] ABSTRACT

A camera has a predicted image display device in which image signals based on different kinds and control values of photographing information are stored and in which images based on the stored image signals are displayed. Photography may be performed based on the kinds and control values of photographing information for a displayed image or images selected by the photographer. The displayed images may have various combinations of luminance values, focus positions, and angles of view.

25 Claims, 15 Drawing Sheets

| FRAME NO. | : k |
|---|---|
| ORDINARY EXPOSURE CONTROL VALUE | : $B_{CND}(k)$ |
| FLASH EXISTENCE CONTROL VALUE | : $S_{CND}(k)$ |
| FOCUS POSITION CONTROL VALUE | : $X_{CND}(k)$ |
| ANGLE OF VIEW CONTROL VALUE | : $f_{CND}(k)$ |

CAMERA HAVING A DISPLAY FOR PREDICTED IMAGES

This is a continuation of application Ser. No. 08/312,985 filed Oct. 3, 1994, which is a continuation of application Ser. No. 08/133,798 Oct. 8, 1993, which is a continuation of application Ser. No. 07/822,954 filed Jan. 21, 1992, all now abandoned.

BACKGROUND OF THE INVENTION

1. Field of the Invention

The present invention relates to a camera having a display for predicted images.

2. Related Background Art

Traditionally, as a camera whereby plural kinds of photographings are performed for the same photographing scene, there has been known a camera having an auto-bracketing function capable of performing a continuous photographing for the numbers of frames designated by indicated exposure steps set by a photographer. This auto-bracketing function is effective when an allowable range of appropriate exposures is narrow or there is a difficulty in determining an appropriate exposure due to a fine difference in brightness in the image plane.

However, in the conventional auto-bracketing photographying, it is unknown whether the photographing has been performed as intended by the photographer or not until when the development is completed even if plural pictures are taken. When a plurality of photographings are performed, there is a tendency that plural pictures having almost no differences in them are taken if the range of the indicated exposure steps is too narrow. This is not economical because the amount of the film used is more than necessary. Also, the photographing is performed using the controlling values provided by the control system of the camera as they are, without any intention of the photographer at all. Thus the pictures are taken just within such a controlling range only if it is considered appropriate, whereas various variations can be considered other than the exposure steps in order to perform photographing even for the same scene.

In a compact camera or an AF single lens reflex camera available recently, handling has been made simple, but it has deprived a photographer of the essential enjoyment in using a camera or of the way of acquiring real photographing skills because the setting of the photographing conditions and others are left to the camera systems. Nevertheless, in many cases, the various functions of a multi-functional camera are only partially used.

SUMMARY OF THE INVENTION

It is an object of the present invention to provide a camera having a predicted image display thereby to enable a photographer to perform an appropriate and intended photographing with only one frame of a film to be used by combining a plurality of the resultant photographings known in advance based on the different controlling values and by selecting such a combination.

It is another object of the present invention to provide a camera having a predicted image display thereby to display the results of the selective use of the various functions provide for a multi-functional camera so as to enable a novice photographer to acquire photographing techniques as well as to attain a variegated and highly assured photographing.

An embodiment of a camera having a predicted image display according to the present invention is structured including a setting unit capable of setting different kinds and control values of photographing information manually or automatically, an image storage unit for storing image signals predicted or preliminarily picked up for the same photographing scene on the basis of different kinds and control values of the photographing information; set by the aforesaid setting unit, a display unit for displaying a plurality of images on the basis of the stored image signals by the aforesaid image storage unit, a selection unit for selecting at least one of the plural images displayed by the aforesaid display unit, and a photographing unit for performing photographing in accordance with the kinds and control values of the photographing information for the selected image by the aforesaid selection unit.

Another embodiment according to the present invention is structured so that the aforesaid selection unit can select the aforesaid respective kinds and control values of photographing information in combination when the aforesaid setting unit has set plural kinds and control values of photographing information.

Still another embodiment according to the present invention is structured so that the aforesaid display unit can .display the control values of the aforesaid respective photographing information.

A further embodiment according to the present invention is structured so that the aforesaid photographing unit can perform photographings for several times in accordance with the kinds and control values of the photographing information for respective images in various combinations when the aforesaid selection unit has selected a plurality of images.

Still a further embodiment according to the present invention is structured so that the aforesaid setting unit can make a setting by combining a luminance value or a focus position or one or plural pieces of photographing information relevant to the angle of view.

Still a further embodiment according to the present invention is structured to include connecting terminals for a plurality of the image signals stored by the aforesaid image storage unit to connect them with the recording unit of an external storing medium.

According to the present invention, it is possible to know a plurality of the resultant photographings by the different control values before performing the photographing because the kinds and control values of the photographing information are set by the setting unit, the image signals predicted or preliminarily picked up for each of the different control values for the same scene are stored, and a plurality of images are displayed by a display unit on the basis of the aforesaid image signals.

Also, it is possible to perform an appropriate photographing assuredly as intended by the photographer because an image is selected by a selection unit from among a plurality of the images displayed by the display unit and the photographing is performed by the photographing unit in accordance with the kind and control values of photographing information for the selected image.

DETAILED DESCRIPTION OF THE PREFERRED EMBODIMENTS

Figure 1:
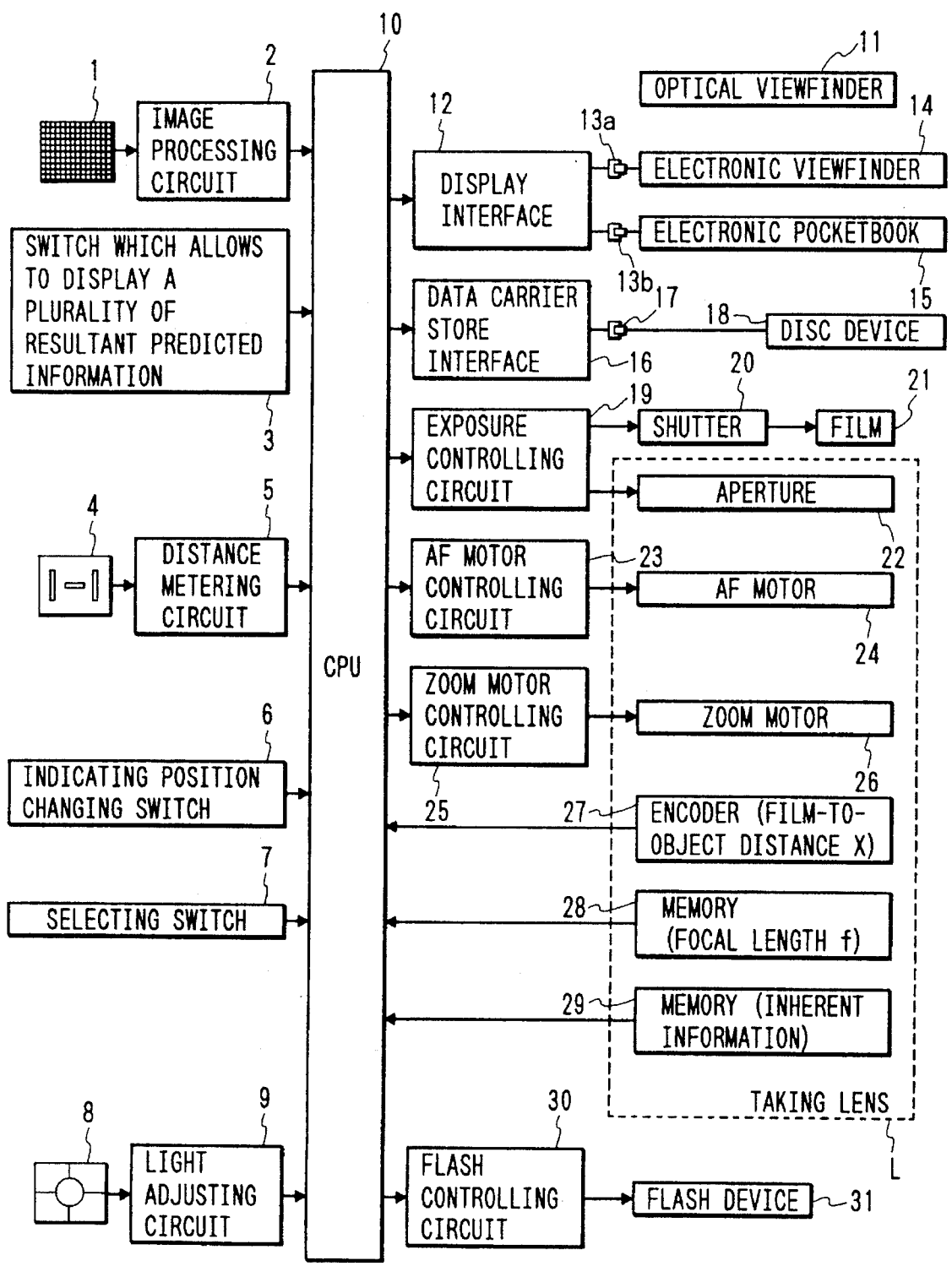
FIG. 1 is a block diagram showing an embodiment of a camera having a predicted image display according to the present invention.

Hereinafter, in accordance with the embodiments, the present invention will be described with reference to the accompanying drawings. FIG. 1 is a diagram showing an embodiment of a camera having a predicted image display according to the present invention.

Figure 2:
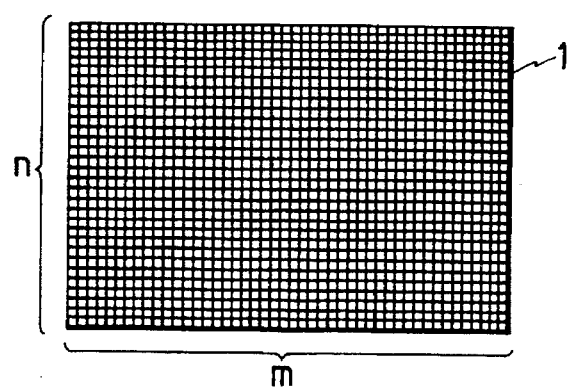
FIG. 2 is a view illustrating the divisional state of the image plane of an image pick up element to be used for an embodiment according to the present invention.

An image pickup element 1 is the element which performs photographing and light adjustment, and as shown in FIG. 2, it has the divisional state of a plane with 540,000 pixels (900 pixels horizontally and 600 pixels vertically). The luminance value obtainable form each of the pixels is assumed to be BAE (m, n) (m=1–900, n=1–600). At this juncture, the address at the lower left side in FIG. 2 is defined as (1,1) while the address at the upper right side, (900, 600). The output of the pickup element 1 is connected to the CPU 10 through a known image processing circuit 2.

To the CPU 10, external device connectors 13a and 13b are connected through a display interface (IF) 12. To the external device connectors 13a and 13b, the electronic view finder 14 which serves as a display unit according to the present invention, and an electronic pocketbook 15 can be connected. In this respect, besides the electronic view finder 14, there is provided an optical view finder 11.

Figure 3:
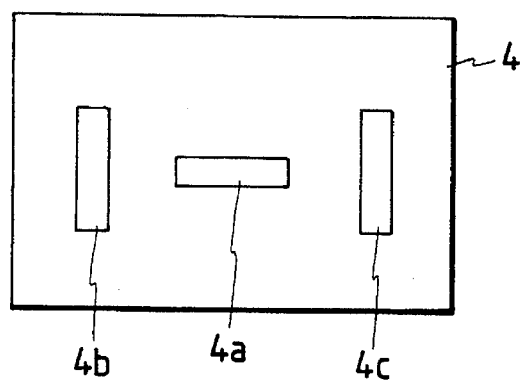
FIG. 3 is a view illustrating the shape of a distance metering frame to be used for an embodiment according to the present invention.

A distance metering element 4 is an element for metering film-to-object distances and as shown in FIG. 3, the framing shape of the distance metering element 4 is made so as to perform the meterings at three locations, the central portion 4a, the left-side portion 4b and the right-side portion 4c. The distance metering value obtainable from the central portion 4a is given as D(1), the distance metering value obtainable from the left-side portion 4b, as D(2), and the distance metering value obtainable from the right-side portion 4c, as D(3). The output from the distance metering element 4 is connected to the CPU 10 through a known distance metering circuit 5. In this respect, the distance metering method is not confined to any one particular method.

To the CPU 10, an external device connector 17 is connected through a data carrier store interface (IF) 16. To the external device connector 17, a disc device 18 is connected to store each of the image data and others. With this disc device 18, it is possible to obtain an electric still photograph by reproducing the contents recorded on the disc.

Also, in the CPU 10, there is connected an exposure controlling circuit 19 to control a shutter 20 and an aperture 22 on a taking lens L side on the basis of the BAE luminance value obtainable from the image pickup element 1 for giving an exposure to a film 21.

Furthermore, in the CPU 10, there are connected an AF motor controlling circuit 23 to drive an AF motor 24 and a zoom motor controlling circuit 25 to drive a zoom motor 26. In FIG. 1, the portion indicated by dotted lines shows the taking lens L side. In the taking lens L, there are incorporated an encoder 27 for detecting the film-to-object distance X from the extended position of the taking lens L, a memory 28 for storing the focal length f, and a memory 29 for storing other inherent information.

An information display authorization switch 3 for plural predictive results is a switch which authorizes entering a mode thereby to display a plurality of predicted image information obtainable from the results of the different control values defined. For switching modes, a known on-off switch can be employed. The indicating position changing switch 6 is a switch for changing the indicated positions of the frame numbers displayed in the electronic view finder 14. A selecting switch 7 is a switch for selecting the displayed frame numbers. The output of each of the switches 6 and 7 is connected to the CPU 10.

Figure 4:
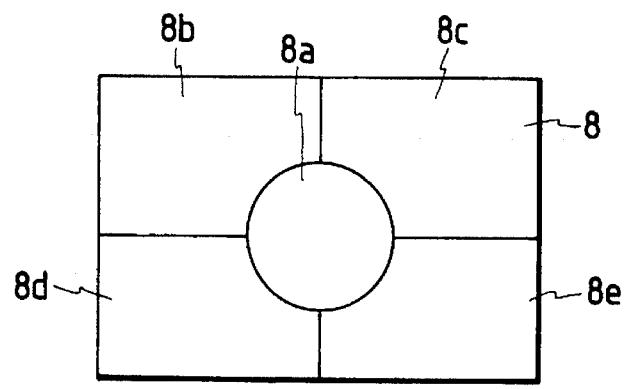
FIG. 4 is a view illustrating the divisional state of the image plane of a light adjusting element to be used for an embodiment according to the present invention.

The light adjusting element 8 is an element for receiving the reflecting rays of light of emitted flash light. In the present embodiment, this element is of a divisional shape divided into five portions, the central portion 8a, upper left portion 8b, upper right portion 8c, lower left portion 8d, and lower right portion 8e on its plane as shown in FIG. 4, and is connected to the CPU 10 through a known light adjusting circuit 9. To the CPU 10, a flash device 31 is connected through a flash controlling circuit 30. The light emission is started by the flash device 31 subsequent to the shutter 20 having been fully opened, and the rays of light of the object field which have been reflected on the plane of a film 21 are photoelectrically converted by the light adjusting element 8. Thus, the amount of the light emission from the flash device 31 is controlled so as to stop the light emission when its amount has reached a predetermined amount of light.

Figure 5:
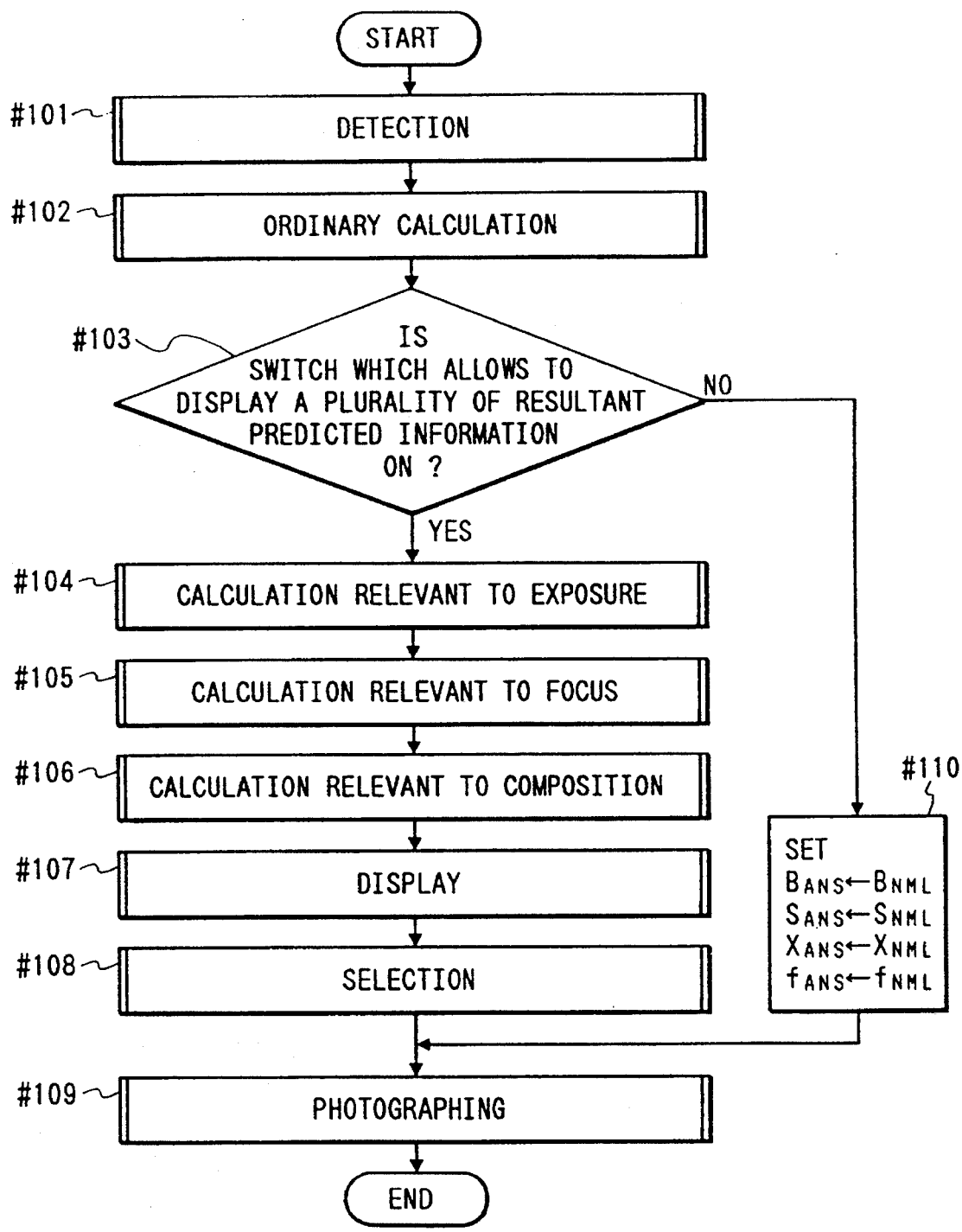
FIG. 5 is a flowchart showing the main routine for the CPU to be used for an embodiment according to the present invention.

Now, the operation of the present embodiment will be described with its flow around the CPU 10 as the center thereof. FIG. 5 is a flowchart showing the main routine for the CPU of the embodiment according to the present invention.

In step #101, there are detected focal lengths fmin and fmax in the memory 28 which is incorporated in the taking lens L, film-to-object distance information X provided by the encoder 27, luminance values BAE from the image pickup element 1, distance metering values D(k) from the distance metering element 4, and others.

In step #102, an ordinary exposure control value B NML, ordinary flash light presence control value S NML which is required to examine the necessity of the presence of a flash light emission, ordinary focus position control value X NML, and ordinary angle of view control value f NML are calculated, respectively, on the basis of the detection results in the step #101 as well as in accordance with known normal algorithms.

In step #103, whether the information display authorization switch 3 for plural predictive results is on or not is examined. If it is on, the process is authorized to enter the mode thereby to display a plurality of images obtainable when different control values are defined in accordance with the present invention before the photographing is performed in step #104 and thereafter. If the switch is not on, the process proceeds to step #110. In the step #110, the process enters an ordinary mode in which no such display as described earlier is executed in order to assign the ordinary exposure control value B NML, ordinary flash light presence control value S NML, ordinary focus position control value X NML, and ordinary angle of view control value f NML, which are respectively calculated in the step #102, to the defined exposure control value BANS, defined flash presence control value SANS, defined focus position control value X ANS, and defined angle of view control value f ANS, which are used for an actual photographing.

Figure 8:
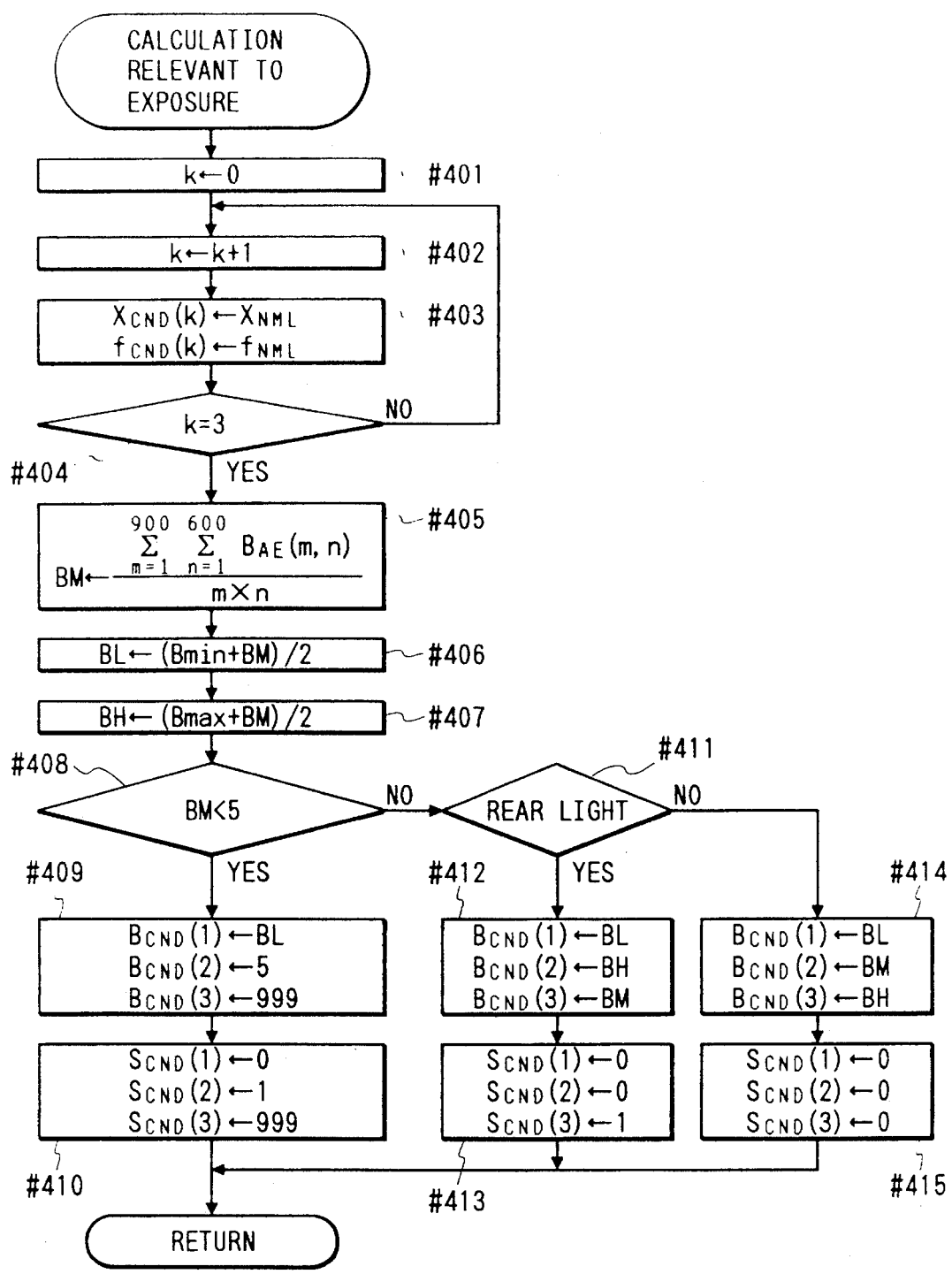
FIG. 8 is a flowchart showing the subroutine of the calculation relevant to exposure for the CPU to be used for an embodiment according to the present invention.
Figure 9:
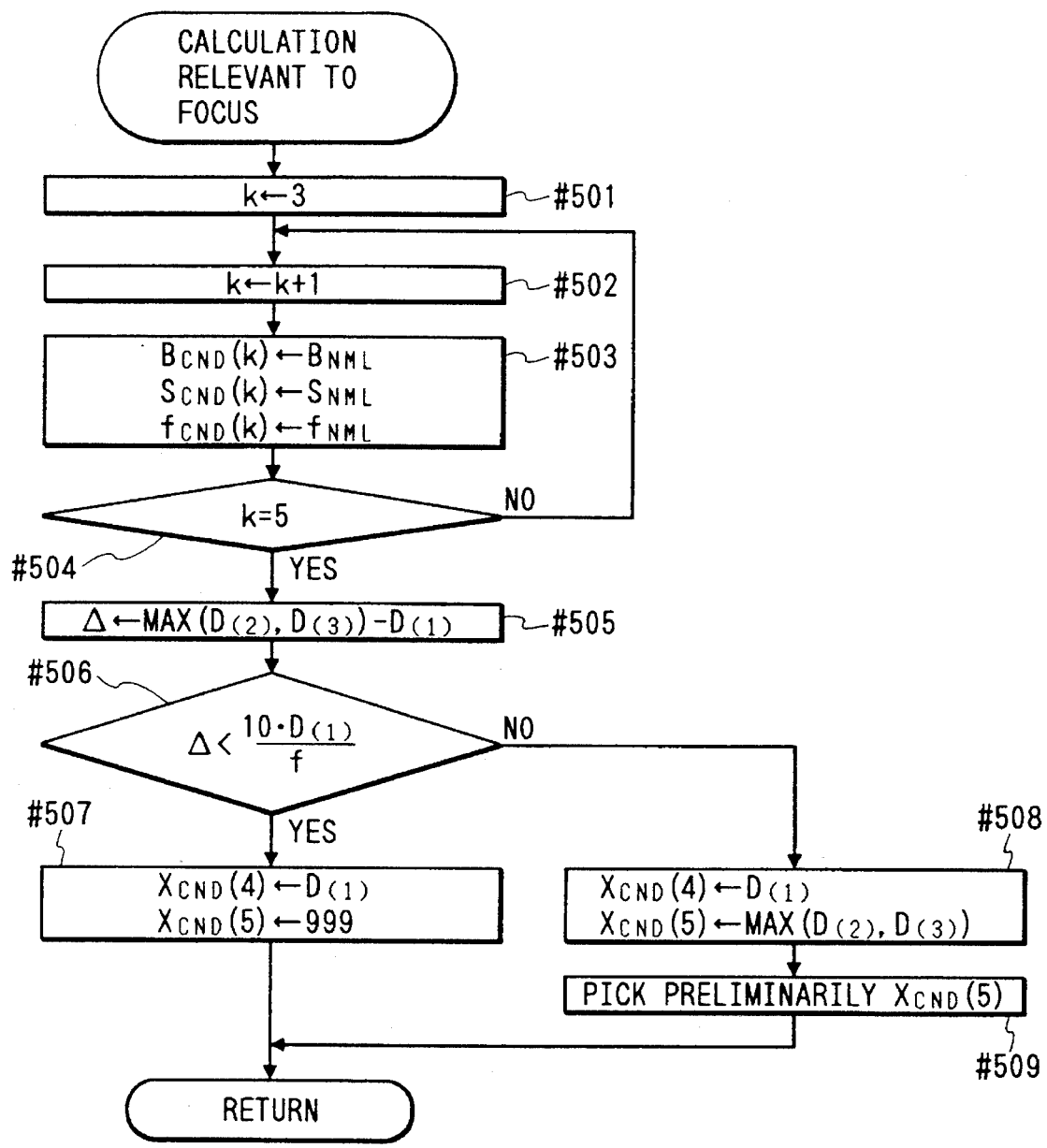
FIG. 9 is a flowchart showing the subroutine of the calculation relevant to focus for the CPU to be used for an embodiment according to the present invention.
Figure 10:
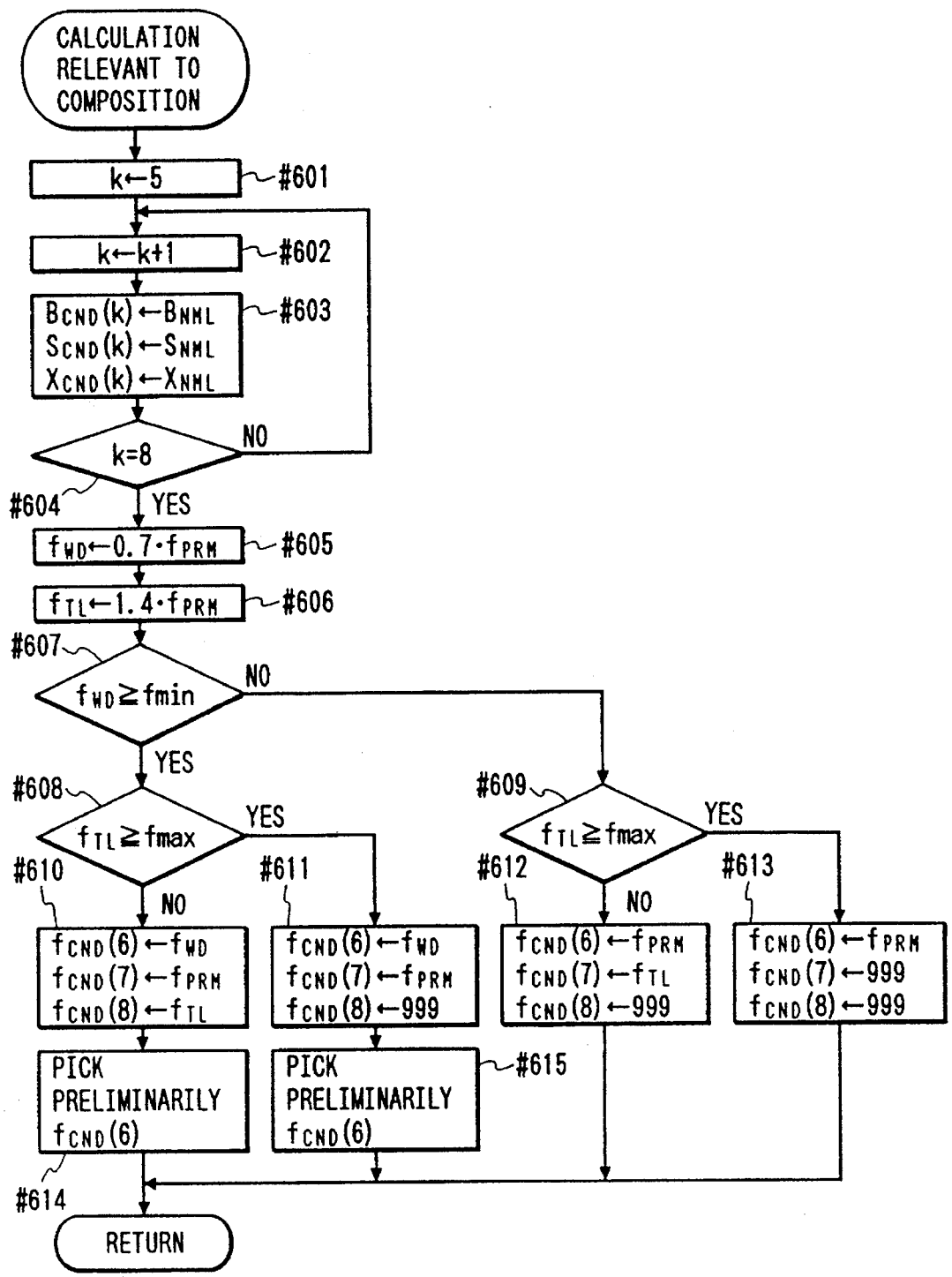
FIG. 10 is a flowchart showing the subroutine of the calculation relevant to composition for the CPU to be used for an embodiment according to the present invention.

In step #104, the subroutine relevant to exposure which is shown in FIG. 8 in detail is executed to calculate an exposure value B CND and flash light presence control value S CND as candidate values. In step #105, the subroutine relevant to focus which is shown in FIG. 9 in detail is executed to calculate a focus position control value X CND as its candidate value. In step #106, the subroutine relevant to composition which is shown in FIG. 10 in detail is executed to calculate an angle of view control value f CND as its candidate value.

Figure 11:
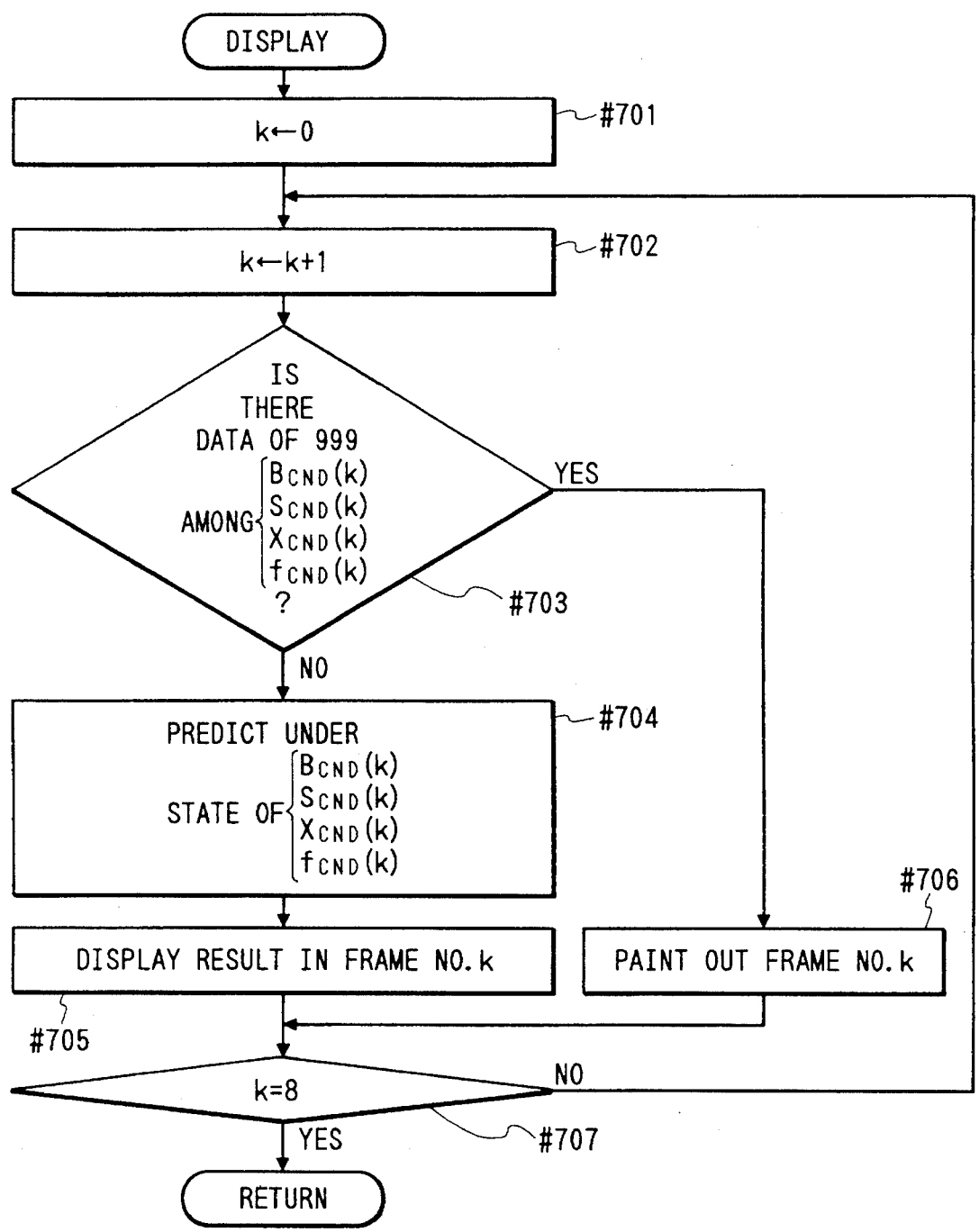
FIG. 11 is a flowchart showing the displaying subroutine for the CPU to be used for an embodiment according to the present invention.

In step #107, the subroutine shown in FIG. 11 in detail is executed to display the candidate values, exposure control value B CND, flash light presence control value S CND, focus position control value X CND, and angle of view control value f CND, which have been calculated in steps #104 through #106 in the electronic view finder 14 (refer to FIG. 15) for each of the frame numbers. Also, if an electronic pocketbook 15 is connected, these candidate values are displayed in the monitor (image) of the electronic pocketbook 15.

Figure 12:
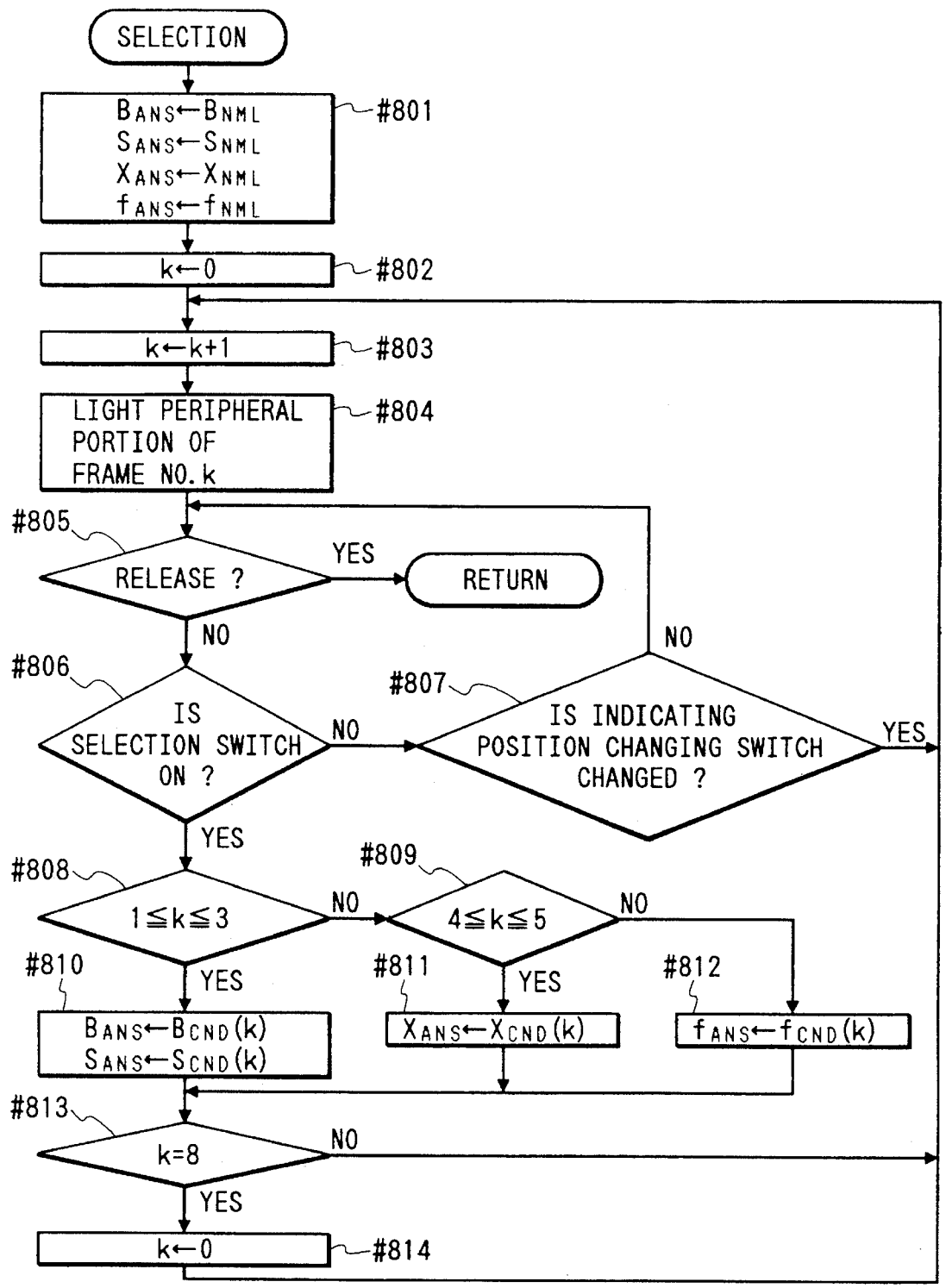
FIG. 12 is a flowchart showing the selection subroutine the CPU to be used for an embodiment according to the present invention.

In step #108, the subroutine shown in FIG. 12 in detail is executed to select arbitrary control values from the exposure control value B CND, flash light presence control value S CND, focus position control value X CND, and angle of view control value f CND, which have plural different candidate values displayed in the step #107 in order to assign them to the defined exposure control value B ANS, defined flash light presence control value S ANS, defined focus position control value X ANS and defined angle of view control value f ANS.

In step #109, the driving unit of the camera is controlled to perform a photographing on the basis of each of the control values B ANS, S ANS, X ANS, and f ANS defined either in the step #108 or in the step #110.

Figure 6:
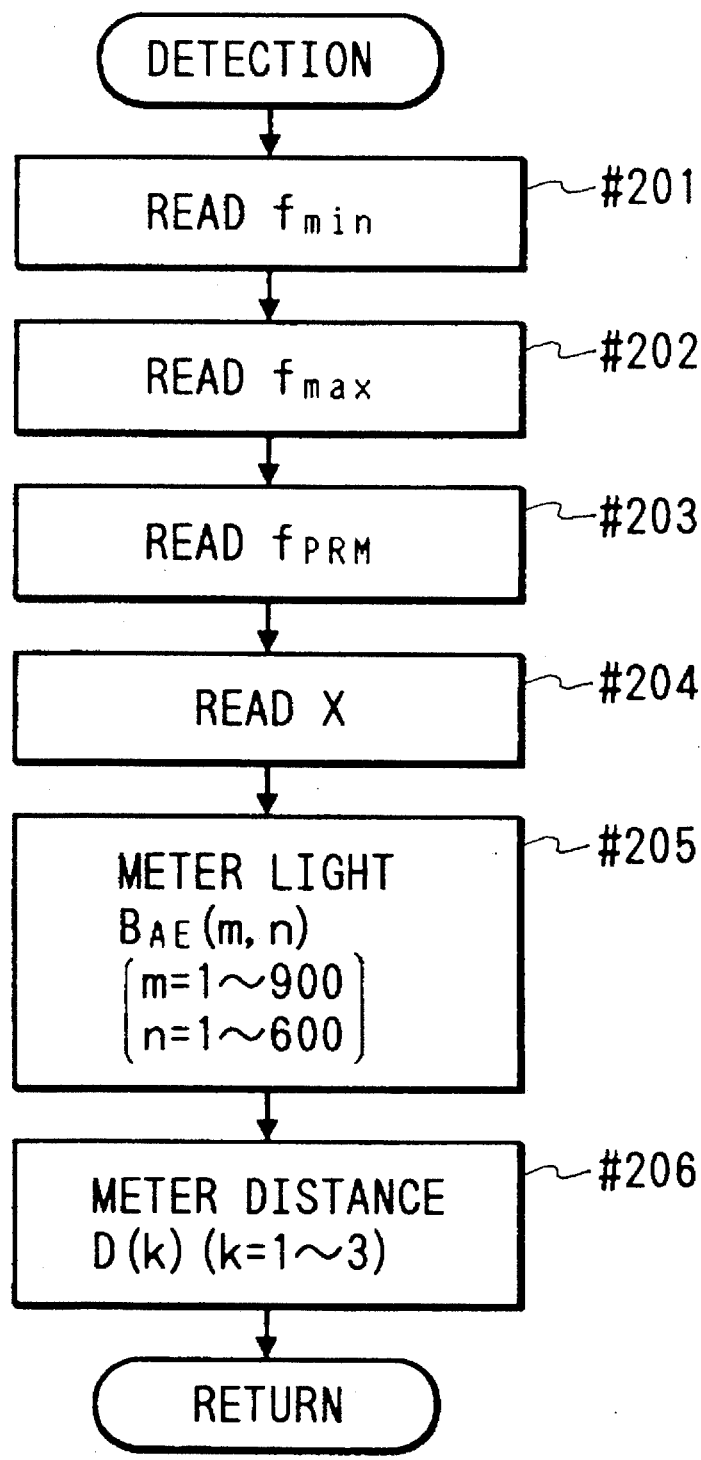
FIG. 6 is a flowchart showing the detection subroutine for the CPU to be used for an embodiment according to the present invention.

Now, the subroutine included in FIG. 5 will be described in detail in conjunction with FIGS. 6 through 12. FIG. 6 is a flowchart showing the detecting operation subroutine for the CPU which constitutes an embodiment according to the present invention.

In step #201 and step #202, the minimum focal length fmin and the maximum focal length fmax of the taking (zoom) lens L mounted are respectively read on the basis of the focal length information f stored in the memory 28 in the taking lens L shown in FIG. 1. Then, in step #203, a defined focal length f PRM is read by a photographer, for example, from the focal length information f in the memory 28 to the mounted taking lens.

In step #204, the film-to-object distance X is read from the detected result of the extended position of the taking lens L by the encoder 27. In step #205, the luminance value BAE (m, n) of each of the divided areas of the image pickup element 1 is read. Then, in step #206, the distance metering value D (k) of the distance metering element 4, that is, the distance metering value D (1) detected in the central portion 4a of the frame as shown in FIG. 3, distance metering value D (2) detected on the left side portion 4b, and distance metering value D (3) detected on the right side portion 4c, is read, respectively.

Figure 7:
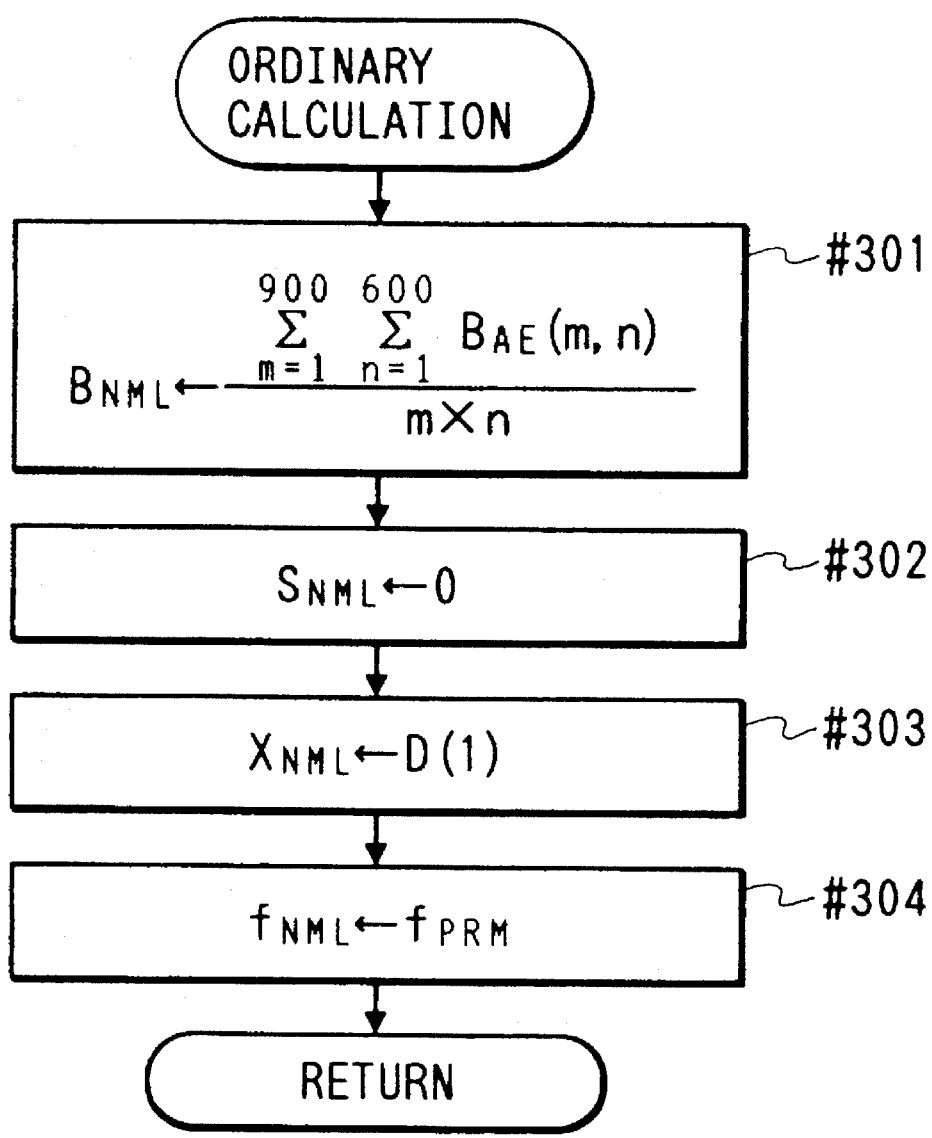
FIG. 7 is a flowchart showing the ordinary calculation subroutine for the CPU to be used for an embodiment according to the present invention.

FIG. 7 is a flowchart showing the ordinary calculation subroutine for the CPU which constitutes an embodiment according to the present invention. In the flowchart shown in FIG. 5, when the process proceeds to the step #110 or there is no selection in the step #108, a photographing is performed on the basis of the result obtained by this calculation subroutine.

In the ordinary calculation, the total sum of all the pixels (m=1 to 900, n=1 to 600) is obtained with respect to the luminance value BAE (m, n) in each of the divided areas by the image pickup element 1, and the average luminance value arrived at by dividing the total sum by the number of the pixels is assigned to the ordinary exposure control value B NML (step #301). Assuming that there is no flash light emission, the ordinary flash presence control value S NML is set at S NML=0 (step #302). The ordinary focus position control value X NML is set at the distance metering value D (1) detected in the central portion 4a of the image plane shown in FIG. 3 (step #303). The ordinary angle of view control value of NML is set at a currently defined focal length f PRM (step #304).

FIG. 8 is a flowchart showing the subroutine of the calculation relevant to exposure for the CPU which constitutes an embodiment according to the present invention.

In step #401 through step #404, the ordinary focus position control value X NML calculated in the step #303 is assigned to the first candidate value of the focus position control value X CND (1) through the third candidate value of the focus position control value X CND (3) and at the same time, the ordinary view of angle control value f NML calculated in the step #304 is assigned to the first candidate value of the angle of view control value f CND (1) through the third candidate value of the angle of view control value f CND (3).

In step #405, the total sum of all the pixels (m=1 to 900, n=1 to 600) is obtained with respect to the luminance value BAE (m, n) of each of the divided areas detected in the step #205, and the arithmetical mean is obtained by dividing the total sum by the number of the pixels, which is assigned to the average luminance value BM. Then, in step #406, the average of the minimum luminance value Bmin detected in the step #205 and the average luminance value BM is obtained by a formula (Bmin+BM)/2 and is assigned to a lower-luminance stressed luminance value BL. In step #407, the average of the maximum luminance value Bmax detected in the step #205 and the average luminance value BM is obtained by a formula (Bmax+BM)/2 and is assigned to a higher luminance stressed luminance value BH.

In step #408 through step #410, there is shown a routine for an exposure setting when the object field is dark. In other words, in the step #408, whether the object field is dark or not is examined. More specifically, whether the average luminance value BM is smaller than 5 [BV]or not is determined. Then, if the average luminance value BM is smaller than 5 [BV], the process proceeds to step #409. In the step #409, the lower luminance stressed luminance value BL is assigned to the first candidate exposure control value B CND (1) as an exposure for which a lower luminance is considered important. A value 5 [BV]is assigned to the second candidate exposure control value B CND (2) as a luminance value required for an ordinary flash photographing. Then, 999 is assigned to the third candidate exposure control value B CND (3) with the assumption that there is no candidate. Thus, the process proceeds to step #410.

In the step #410, the flash presence control values S CND (1) to S CND (3) are defined for the first to third candidates in the step #409. In other words, zero is assigned to the first candidate flash presence control value S CND (1) with the assumption that there is no flash light emission, and 1 is assigned to the second candidate flash presence control value S CND (2) with the assumption that there is a flash light emission. Then, 999 is assigned to the third flash presence control value S CND (3) with the assumption that there is no candidate.

If the average luminance value BM is found to be larger than or equal to 5 [BV]in the step #408, whether the object field is a rear light or not is determined in step #411. If found to be a rear light, that is, the object field is bright and it has a rear light, the process proceeds to step #412 and step #413. Here, the detection is made to determine whether it is a rear light or not by comparing the average luminance value in the vicinity of the central portion with the average luminance value in the circumferential portion thereof, and if the average luminance value in the vicinity of the central portion is darker than a predetermined value, then the luminance is discriminated as a rear light.

In step #412, the lower luminance stressed luminance value BL is assigned to the first candidate exposure control value B CND (1), the higher luminance stressed luminance value BH is assigned to the second candidate exposure control value B CND (2), and the average luminance value BM is assigned to the third candidate exposure control value B CND (3). Then, the process proceeds to step #413.

In the step #413, the flash presence control values S CND (1) through S CND (3) are defined with respect to the first to third candidates in the step #412. In other words, the first and second candidate flash presence control values are assumed to have no flash emission, and the assignment is made as S CND (1)=0 and S CND (2)=0 while the third flash presence control value is assumed to have a flash emission, and the assignment is made as S CND (3)=1.

In step #414 through step #415, there is shown a routine for the case where the object field is bright and it has a normal light. In step #411, if the luminance is not found to be a rear light, the process proceeds to the step #414.

In the step #414, the lower luminance stressed luminance value BL is assigned to the first candidate exposure control value B CND (1), the average luminance value BM is assigned to the second candidate luminance value B CND (2), and the higher luminance stressed luminance value BH is assigned to the third candidate exposure control value B CND (3). Then, the process proceeds to step #415.

In the step #415, the flash presence control values S CND (1) through S CND (3) are defined with respect to the first to third candidates in the step 414. In other words, the first to third candidate flash presence control values are all assumed to have no flash emission, and the assignment is made as S CND (1)=0, S CND (2)=0, and S CND (3)=0, respectively.

FIG. 9 is a flowchart showing the subroutine of the focus relevant operation for the CPU which constitutes an embodiment according to the present invention. In step #501 through #504, each of the ordinary control values B NML, S NML, and f NML are assigned to the first candidate (k=4) and the second candidate (k=5) of the exposure control value B CND (k), flash presence control value S CND (k), and angle of view control value f CND (k).

In step #505, the distance difference Δ between the farthest distance in the circumference and the distance in the central portion is obtained by a formula |MAX (D (2), D(3)) −D (1)|.

In step #506, whether the distance difference Δ is smaller than 10 D (1)/f or not is determined. If it is smaller, then the process proceeds to step #507. If it is larger than or equal thereto, the process proceeds to step #508.

In the step #507, the distance metering value D (1) in the central portion is assigned to the first candidate focus position control value X CND (4) and 999 is assigned to the second candidate focus control value X CND (5) with the assumption that there is no candidate for such a position.

In step #508, the distance metering value D (1) in the central portion is assigned to the first candidate focus position control value X CND (4) and MAX (D (2), D (3)) is assigned to the second candidate focus position control value X CND (5). In this case, the taking lens L actually travels to a position designated by the focus position control value X CND (5) in the step #508 to pick up that value preliminarily.

FIG. 10 is a flowchart showing the subroutine of the operation relevant to the composition calculation for the CPU which constitutes an embodiment according to the present invention. In step #601 through step #604, the ordinary control values B NML, S NML, and x NML are assigned to the first to third candidates (k=6 to 8) of the exposure control value B CND (k), flash presence control value S CND (k), and focus position control value X CND (k).

In step #605, a wide side focal length f WD =0.7 f PRM is operated on the basis of the defined angle of view control value f PRM detected in the step #203. In step #606, a telescopic side focal length f TL=1.4 f PRM is operated. If the defined focal length f PRM=50 mm, for example, the resultant operation will be the wide side focal length f WD=35 mm while the telescopic side focal length f TL=70 mm.

In step #607, whether the wide side focal length f WD is more than the minimum focal length fmin or not is examined. Then, the process proceeds to step #608 if the wide side focal length f WD is more than the minimum focal length fmin. If the wide side focal length f WD is smaller than the minimum focal length fmin, the process proceeds to step #609.

In the step #608, whether the telescopic side focal length f TL is greater than the maximum focal length fmax or not is examined. Then, if it is smaller than the maximum focal length fmax, the process proceeds to step #610. If it is greater than the maximum focal length fmax, the process proceeds to step #611. Also, in the step #609, whether the telescopic side focal length f TL is smaller than the maximum focal length fmax or not is examined. Then, if it is smaller than the maximum focal length fmax, the process proceeds to step #612. If it is greater than the maximum focal length fmax, the process proceeds to step #613.

In the step #610, both wide side focal length f WD and telescopic side focal length f TL can be defined, and a wide side focal length f WD is assigned to the first candidate angle of view control value f CND (6), a defined focal length f PRM is assigned to the second candidate angle of view control value f CND (7), and a telescopic side focal length f TL is assigned to the third candidate angle of view control value f CND (8).

In the step #611, while the wide side focal length f WD can be defined, the telescopic side focal length f TL cannot be defined, and a wide side focal length f WD is assigned to the first candidate angle of view control value f CND (6), a defined focal length f PRM is assigned to the second candidate angle of view control value f CND (7), and 999 is assigned to the third candidate angle of view control value f CND (8) with the assumption that there is no candidate value.

In the steps #610 and #611, the taking lens L travels to the value designated by the first candidate angle of view control value f CND (6) to perform a preliminary pick up (step #614 and step #615).

In the step #612, while the wide side focal length f WD cannot be defined, the telescopic side focal length f TL can be defined, and a defined focal length f PRM is assigned to the first candidate angle of view control value f CND (6), a telescopic side focal length f TL is assigned to the second candidate angle of view control value f CND (7), and 999 is assigned to the third candidate angle of view control value f CND (8) with the assumption that there is no candidate value.

In the step #613, neither the wide side focal length f WD nor the telescopic side focal length f TL can be defined, and a defined focal length f PRM is assigned to the first candidate angle of view control value f CND (6) and 999 is assigned to the second and third candidate angle of view control values f CND (7) and f CND (8), respectively, on the assumption that there are no candidate values. In this case, it should be considered that a single focus lens or a lens having a small zooming ratio is employed.

In each of the aforesaid steps #610 to #613, the defined positions, predictive positions, and the positions which require preliminary pickups are as shown in a table given below, and as there is no information available in the wide side beyond the defined position, it is necessary to perform preliminary pickups for the preparation of the actual photographings.

| Step:    | #610                 | #611                 | #612             | #613             |
|----------|----------------------|----------------------|------------------|------------------|
| Wide W:  | Preliminary pickup   | Preliminary pickup   | —                | —                |
| Normal N:| Defined position     | Defined position     | Defined position | Defined position |
| Tele T:  | Predictive           | —                    | Predictive       | —                |

In this respect, it may be possible to perform preliminary pickups sequentially for all the candidates under the corresponding conditions, but as to the exposure and focal length, it is possible to perform pseudo-predictions. For example, with a method disclosed in Japanese Patent Laid-Open Application No. 62-50743, it is possible to display a predictive result artificially without any actual zooming. In predicting a composition, it may be unnecessary to perform any preliminary pickup to be used for the display in order to enhance the rapidity in photographing if the target includes the major object, the size of which should be observed only or the like.

Figure 15:
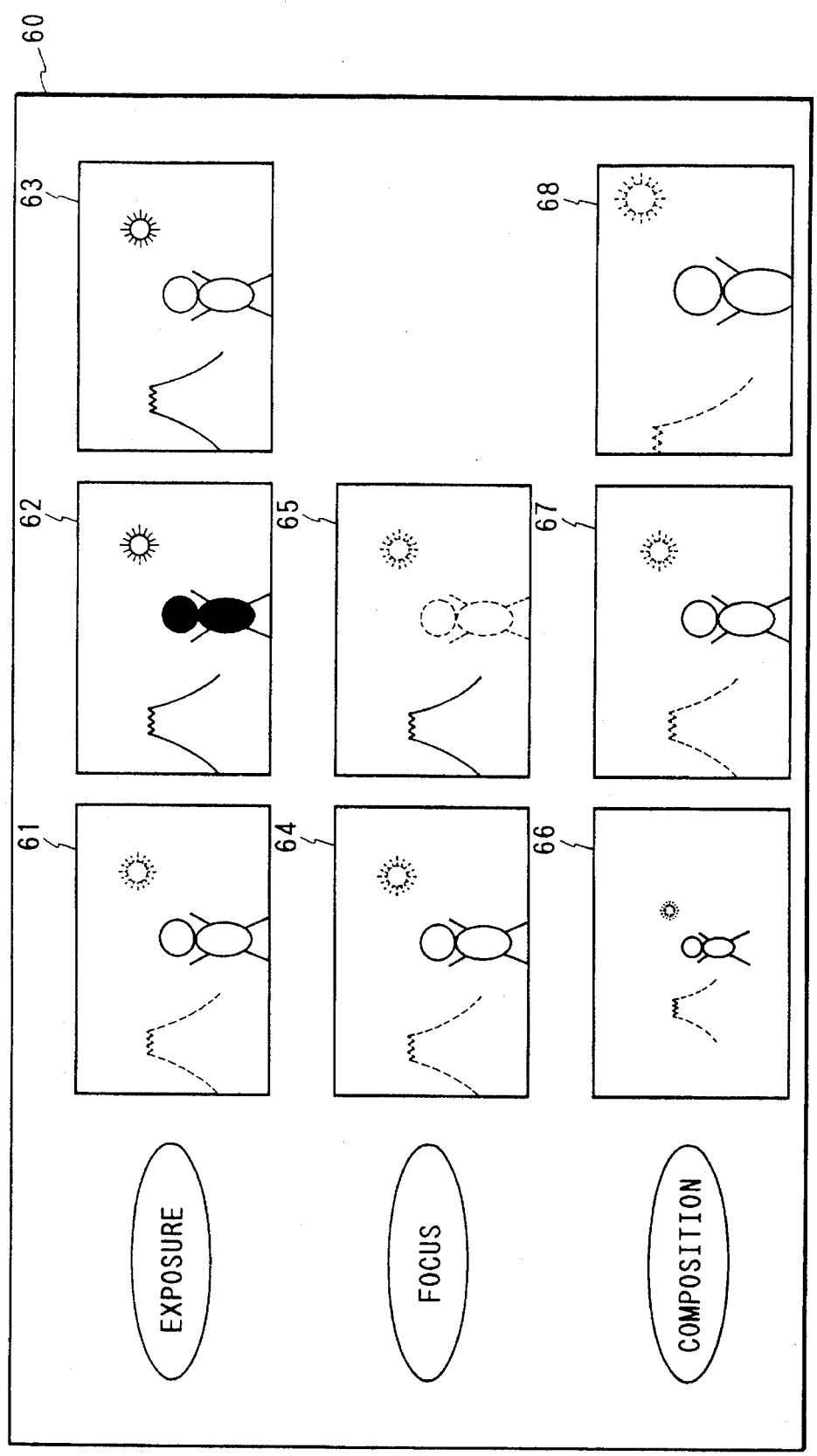
FIG. 15 is a view illustrating an example of a resultant display in an electronic view finder of the execution of the subroutine example shown in FIG. 11.

FIG. 11 is a flowchart showing the subroutine of the operation relevant to display for the CPU which constitutes an embodiment according to the present invention. By each of the candidate values calculated as aforesaid, the prediction of all the candidates (k=1 to 8) is performed (steps #701, #702 and #707) for the exposure control value B CND (k), flash presence control value S CND (k), focus position control value X CND (k), and angle of view control value f CND (k), and the result for each frame No. k is displayed as shown in FIG. 15 (step #705). At this juncture, if there is any 999 data in the candidate of each of the control values B CND (k), S CND (k), X CND (k), and f CND (k) (step #703), the frame No. k is painted out and no display is performed (step #706).

Figures 13, 14:
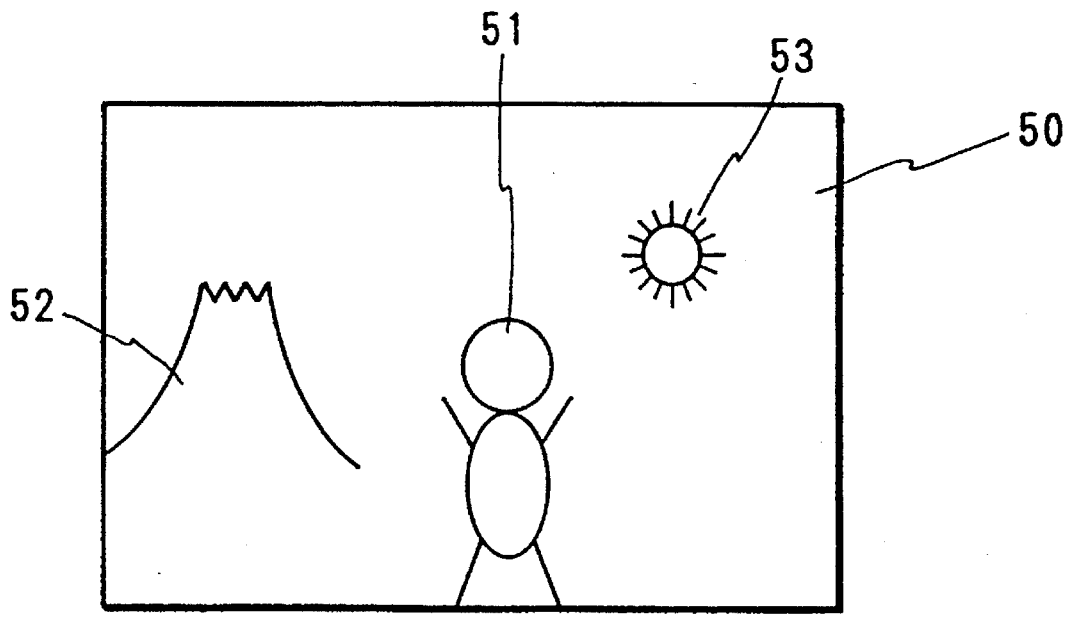
FIG. 13 is a view illustrating an example of a photographing scene.
FIG. 14 is a view illustrating an example of a data table of numeral values.

Here, a description will be given with a photographing object field 50 as shown in FIG. 13 in view, which has a person 51 located in the center thereof, a background mountain 52 positioned on the left-hand side and the sun 53 included above on the right-hand side of the photographing scene.

In such a case, the field is bright and has a rear light. Accordingly, for the calculation relevant to exposure as described in FIG. 8, the steps #412 and #413 will be executed. In other words, the first candidate becomes B CND (1)=BL, S CND (1)=0, and an image 61 (FIG. 15) is displayed, in which the exposure is just fit for the person without regard to the background. The second candidate becomes B CND (2) =BH, S CND (2)=0 and an image 62 is displayed with the person in silhouette The third candidate is B CND (3)=BM, S CND (3)=1 and an image 63 is displayed in a daylight synchro state.

Also, the distance to the person 51 is metered in the central portion 4a of the distance metering element 4 shown in FIG. 3 while the distance to the mountain 52 is metered on the left-hand side portion 4b, and the distance difference Δ between the two objects is greater than a predetermined value (step #506 in FIG. 9). Hence, the process in the step #508 is executed. In other words, the first candidate becomes X CND (4) =D (1) and there is displayed an image 64 with the person 51, the distance of which is metered in the central portion 4a, being focused. Also, the second candidate becomes X CND (4)=MAX (D (2), D (3)) and there is displayed an image 65 with the mountain 52, the distance of which is metered on the left-hand side portion 4, being focused.

Furthermore, assuming that the mounted taking lens L is a zoom lens of f=28 to 85 mm and that the defined focal length f PRM is set at the person 51 with f PRM =50 mm, the calculation is performed in the steps #605 and #606 in FIG. 10 so that the wide side focal length f WD=35 mm while the telescopic side focal length f TL=70 mm. As a result, both wide side focal length f WD and telescopic side focal length f TL can be defined and the step #610 is executed accordingly. In other words, the first candidate becomes f CND (6)=f WD and an image 66 which is focused in the wide side focal length is displayed. The second candidate becomes f CND (7)=f PRM and an image 67 which is focused in the defined focal length is displayed. The third candidate becomes f CND (8)=f TL and an image 68 which is focused in the telescopic side focal length is displayed.

Figure 16:
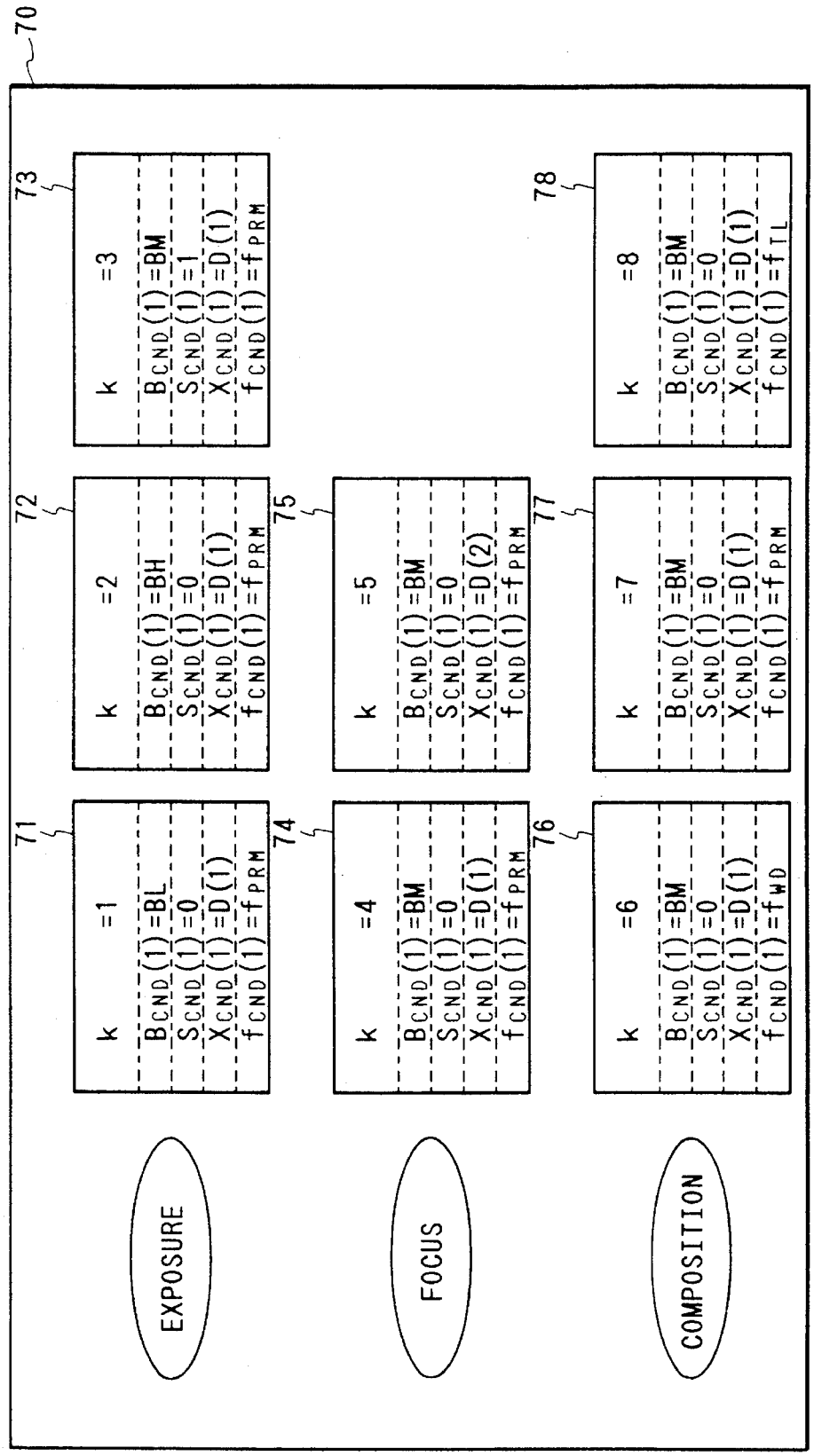
FIG. 16 is a view showing the control values with respect to each of the frames in FIG. 15.

In this respect, the image data 61 through 68 shown in FIG. 15 are stored as numeral data per frame number as shown in FIG. 14, and it may be possible to display the numeral data 71 through 78 corresponding to the image 61 through 68 in the electronic view finder 14 (refer to FIG. 16). Also, if these data are output to the electronic pocketbook 15 through the external terminal 13b, both storage and display can be performed by the electronic pocketbook 15.

FIG. 12 is a flowchart showing the subroutine of the selection operation for the CPU which constitutes an embodiment according to the present invention. In step #801, each of the ordinary control values B NML, S NML, X NML, and f NML are assigned respectively to the defined control values B ANS, S ANS, X ANS, and f ANS. In step #802 and step #803, successive frame numbers k are changed.

In step #804, the circumference of a frame number K is illuminated. In step #805, whether a releasing is performed or not is examined. If releasing is not performed, whether the selecting switch 7 is turned on or not is examined in step #806. If the selecting switch 7 is turned on, in step #808 whether 1≦k≦3 or not is determined.

In the case of 1≦k≦3, B CND (k) is assigned to B ANS with respect to the exposure control value and S CND (k) is assigned to S ANS with respect to the flash presence control value, respectively, in step #810. If the case is not 1≦k≦3, then in step #809, whether 4≦k≦5 or not is determined. In the case of 4≦k≦5, the process proceeds to step #811.

In the step #811, X CND (k) is assigned to X ANS with respect to the focus position control value. If the case is not 4≦k≦5, then in step #812, f CND (k) is assigned to f ANS with respect to the angle of view control value. This operation is performed from the frame No. 1 to No. 8 (see step #813). Then, after eight times, in step #814 the frame number is set as k=0. The process returns to the step #803.

If the selecting switch 7 is not turned on, then whether the indicating position changing switch 6 is changed or not is examined (step #807). If changed, the process returns to the step #803; if not, to the step #805.

In other words, the frame number k (k=1 to 8) is sequentially changed by the indicating position changing switch 6. The circumference of the frame number k which has been changed anew is illuminated. Then, if a photograph having such images 61 through 68 shown by this particular frame number k should be taken, the selecting switch 7 is turned on.

The embodiment is not confined to the one set forth above. Various modifications are possible, and it is to be understood that those modifications are within the scope of the present invention. For example, while changing the indicating position changing switch 6, selections may be repeated by the selecting switch 7 for storage so as to take plural photographs. Also, selections may be made in the sequence of composition, focus, exposure, and the like to produce a desired image for display. It may also be possible to display the exposure, focus, and composition shown in FIG. 15 in each different combination.

According to the present invention as described above in detail, predicted images can be observed to select them before actual photographing. Consequently, there is an effect that it is possible to avoid taking plural photographs which look alike and that it is possible to take an intended photograph assuredly.

Also, by the display of predicted results as well as its selections, the photographer can intend a photography experimentally by combining the setting up and resultant images and enjoy various combinations. Simultaneously, this results in an educational effect which enables the photographer to acquire the fundamental techniques required for a high-class amateur photographer or professional photographer to use some of the manual cameras freely. In other words, even those who have just relied on a camera to take a picture and do not know that there is a wider world of images will be able to acquire such a knowledge by using a camera provided with a display for predicted images according to the present invention.

Figure 17:
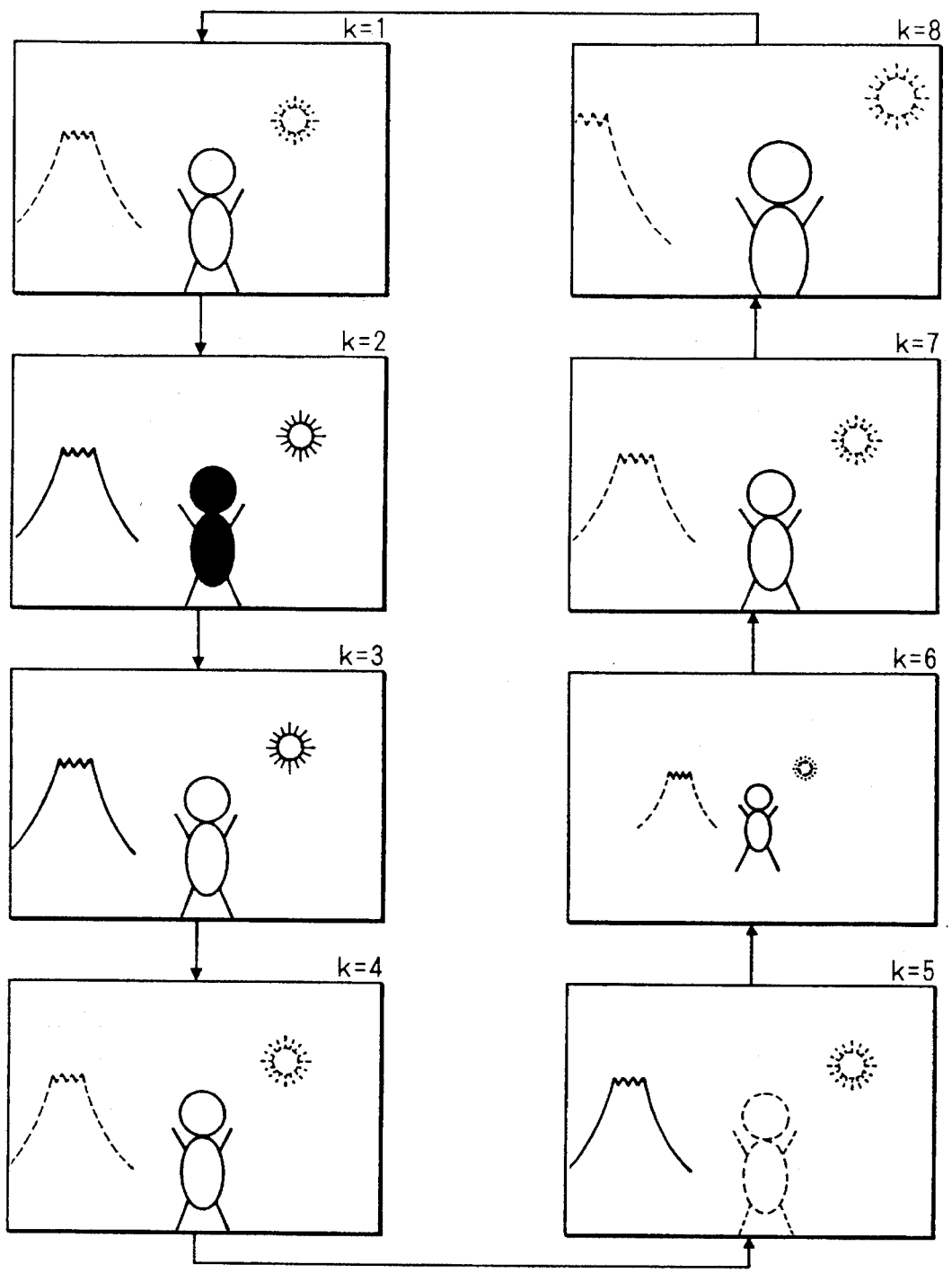
FIG. 17 illustrates image representations when the frame numbers are changed sequentially by an indicating position changing switch in an embodiment where one image is displayed.
Figure 18:
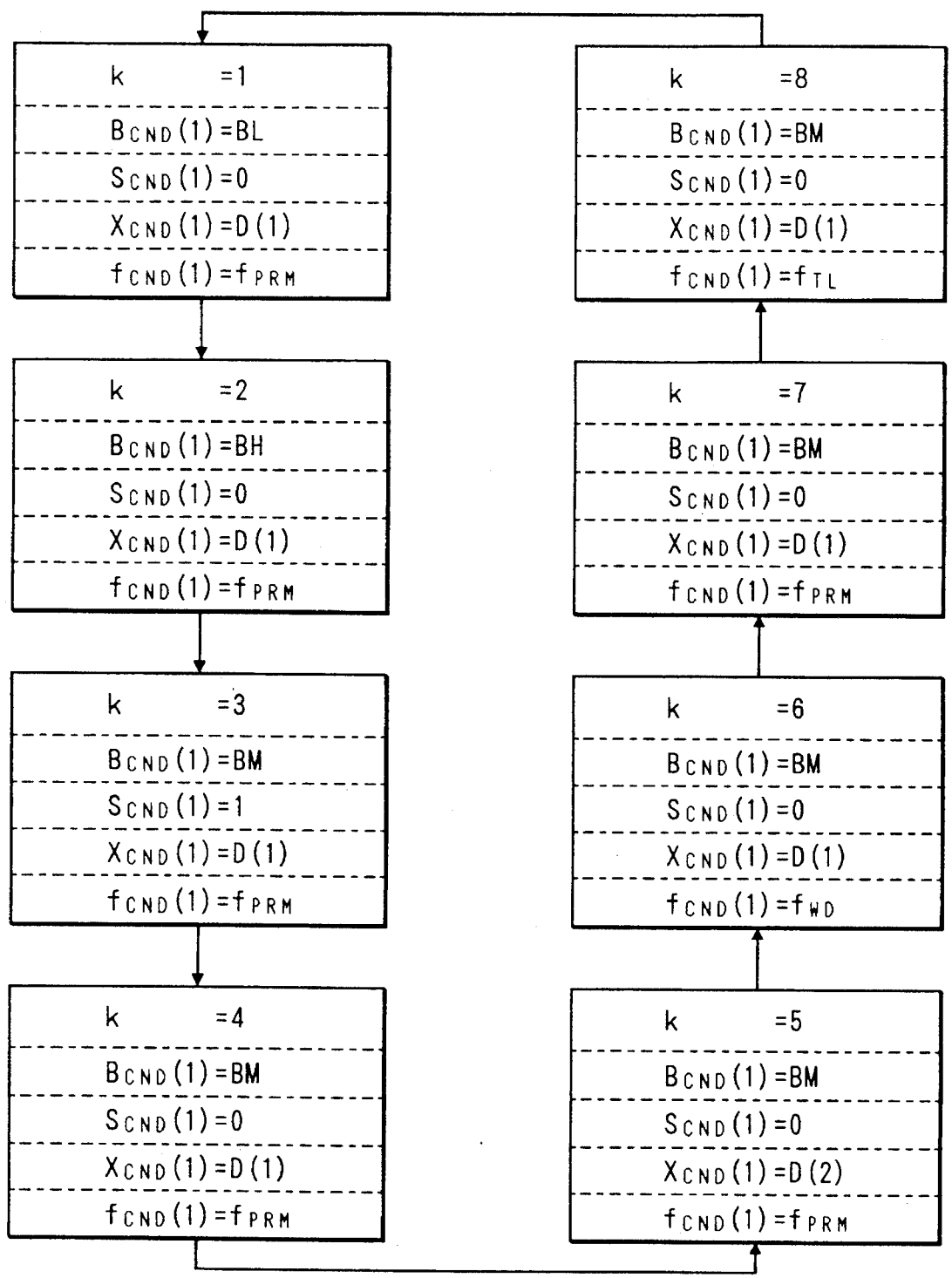
FIG. 18 illustrates the data of the numeral values when the frame numbers are changed sequentially by the indicating position changing switch in the embodiment where one image is displayed.

In this respect, it may also be possible to make an arrangement so that with one image to be displayed, the frame numbers k are sequentially changed by the indicating position changing switch 6 and each time the number is changed, the image of that particular frame number k is displayed as shown in FIG. 17 and FIG. 18.

What is claimed is:

1. A camera having a predicted image displaying device including:

a setting device which sets control values of different photographing information manually or automatically;

a predicting circuit which predicts image signals for the same photographing scene based on at least one control value among the control values of the photographing information set by said setting device;

an image storing device which stores the image signals predicted by said predicting circuit;

a displaying device which displays a plurality of images based on the image signals stored by said image storing device;

a selecting device which selects at least one image among a plurality of the images displayed by said displaying device; and a photographing device which performs photographing on the basis of the control values of the photographing information for the image selected by said selecting device.

2. A camera according to claim 1, wherein said selecting device can select an image for each of said different photographing information by combining the photographing information when a plurality of photographing information are set by said setting device.

3. A camera according to claim 1, wherein said image signals include control values and said displaying device displays each of the control values of said photographing information stored in said image storing device.

4. A camera according to claim 1, wherein said photographing device performs plural numbers of photographings on the basis of the control value of the photographing information for each of said images or combinations thereof when a plurality of images are selected by said selecting device.

5. A camera according to claim 1, wherein said setting device sets the control values of the photographing information by combinations thereof with respect to luminance values or focus positions or angles of view.

6. A camera according to claim 1, wherein said camera further includes the following:
connecting terminals which connect a plurality of the image signals stored by said image storing device to storing devices of external storage media.

7. A camera according to claim 1, wherein said camera further includes the following:
a device which makes possible with a finder the observation of angle of view different from a defined angle of view.

8. A camera according to claim 7, wherein said camera further includes the following:
a switch allowing an angle of view to become different from the defined angle of view.

9. A camera according to claim 7, wherein said camera further includes the following:
a zooming device which implements an angle of view different from the defined angle of view by zooming a photographing zooming lens.

10. A camera according to claim 9, wherein said zooming device has a motor as its driving source.

11. A camera according to claim 7, wherein said angle of view different from the defined angle of view is an angle of view on the WIDE side.

12. A camera according to claim 7, wherein said angle of view different from the defined angle of view is an angle of view on the TELE side.

13. A camera according to claim 7, wherein said angle of view different from the defined angle of view is an angle of view having a predetermined magnification of the defined angle of view.

14. A camera according to claim 7, wherein said angle of view different from the defined angle of view is restored to said defined angle of view by operating a shutter button.

15. A camera according to claim 7, wherein an exposure value which corresponds to said defined angle of view is provided by divisional light meterings.

16. A camera according to claim 7, wherein a focus control which corresponds to said defined angle of view is provided by a multi-point autofocus device.

17. A camera having a predicted image displaying device including:
a setting device which sets control values of different photographing information manually or automatically;
a predicting circuit which predicts image signals for the same photographing scene based on at least one control value among the control values of the photographing information set by said setting device;
an image storing device which stores the image signals predicted by said predicting circuit;
a selecting device which selects one image among a plurality of images based on the image signals stored by said image storing device;
a displaying device which displays the image selected by said selecting device; and
a photographing device which performs photographing on the basis of the control values of the photographing information for the image displayed by said displaying device.

18. A camera comprising:
a zoom lens which alters a focal length thereof;
a zooming device which automatically alters the focal length of said zoom lens;
a setting device which manually sets the focal length of said zoom lens;
an exposure controlling circuit which performs an exposure control in a photographing angle of view at the focal length set by said setting device;
an operation member;
a controlling circuit which enables said zooming device in response to an operation of said operation member to alter the focal length of said zoom lens which is set by said setting device to a different focal length; and
a displaying device which displays an image of the photographing angle of view at said different focal length.

19. A camera having a predicted image displaying device according to claim 18, wherein said camera having a predicted image displaying device is provided with:
a divisional light metering circuit which performs divisional light meterings in an object field; and
said exposure controlling circuit which performs exposure controls in accordance with the exposure values from the light metering by said divisional light metering circuit within a light metering range corresponding to said photographing angle of view.

20. A camera having a predicted image displaying device according to claim 18, wherein said camera having a predicted image displaying device is provided with:
a multi-point distance metering device which performs multi-point distance meterings in an object field; and
a focus controlling device which performs focus controls in accordance with the distance metering values by said multi-point distance metering device within a distance metering range corresponding to said photographing angle of view.

21. A camera comprising:
a zoom lens which alters a focal length thereof;
a zooming device which automatically alters the focal length of said zoom lens;
a setting device which manually sets the focal length of said zoom lens;
an exposure controlling circuit which performs an exposure control in a photographing angle of view at the focal length set by said setting device;
an operation member;
a first controlling circuit which enables said zooming device in response to an operation of said operation member to alter the focal length of said zoom lens which is set by said setting device to a different focal length;
a displaying device which displays an image of the photographing angle of view at said different focal length;
a release operating member; and
a second controlling circuit which restores the photographing angle of view at said different focal length to a photographing angle of view at the focal length which is set by said setting device when a release is performed by said release operating member and enables said exposure controlling circuit.

22. A camera having a predicted image displaying device according to claim 21, wherein said second controlling circuit sets said different angle of view by controlling said zooming device to zoom the photographing zoom lens to the wide side.

23. A camera having a predicted image displaying device according to claim 21, wherein said second controlling circuit sets said different angle of view by controlling said zooming device to zoom the photographing zoom lens to the telescopic side.

24. A camera having a predicted image displaying device according to claim 21, wherein said second controlling circuit sets said different angle of view by controlling said zooming device to zoom the photographing zoom lens to a predetermined magnification.

25. A camera having a predicted image displaying device according to claim 21, wherein said second controlling circuit controls said different angle of view to be restored to said photographing angle of view by operating said release operating member.

* * * * *